United States Patent
Bliek et al.

3,764,216
Oct. 9, 1973

[54] INTERFEROMETRIC APPARATUS

[75] Inventors: David C. Bliek, Macedon; Kenneth A. Snow; Richard E. Vandewarker, both of Rochester, all of N.Y.

[73] Assignee: Bausch & Lomb Incorporated, Rochester, N.Y.

[22] Filed: Mar. 2, 1971

[21] Appl. No.: 120,338

Related U.S. Application Data

[63] Continuation of Ser. No. 631,797, April 18, 1967, abandoned.

[52] U.S. Cl.................... 356/106, 356/109, 350/3.5
[51] Int. Cl........................... G01b 9/02, H01s 3/00
[58] Field of Search........................... 356/106, 109; 350/3.5

[56] References Cited
UNITED STATES PATENTS

| | | | |
|---|---|---|---|
| 3,511,554 | 5/1970 | Osterberg et al. | 350/3.5 |
| 2,770,166 | 11/1956 | Gabor | 350/3.5 |

OTHER PUBLICATIONS

"Investigation of Hologram Techniques" Leith et al. Willow Run Laboratories, Dec. 1965.
Van Ligten, R. et al., "Holographic Microscopy," Nature, Vol. 211, July 1966, p. 282–283.
Leith, E. N. et al., "Microscopy By Wavefront Reconstruction," JOSA, Vol. 55, No. 5, May 1965, p. 569–570.
Collier, R. J. et al., "Application of Moire Techniques to Holography" from Applied Physics Letters, Oct. 15, 1965, p. 223–225.
Leith, Emmet N., et al., "Wavefront Reconstruction With Diffused Illumination and Three Dimensional Objects," JOSA, Vol. 54, No. 11, Nov., 1964, pp. 1295–1301.
Leith, Emmet N. et al., "Investigation of Hologram Techniques," Report of the University of Michigan, Dec., 1965, pp. 5–12 relied upon.

*Primary Examiner*—Ronald L. Wibert
*Assistant Examiner*—Conrad Clark
*Attorney*—Frank C. Parker and Charle C. Krawczyk

[57] ABSTRACT

An interferometer utilizing holography for object comparison comprises a laser for generating a laser beam for dividing into a reference beam and a test beam. The beams are subsequently recombined to provide an interference pattern. Standard reflective or transmitting objects are positioned in the test beam and a permanent holographic recording of the interference pattern is made. Objects to be tested or compared to the standard are substituted for the standard. A second interference pattern is developed by radiation reflected or transmitted through the test object, the reference beam, and the reconstructed waveforms of the prior interference pattern recorded in the hologram.

11 Claims, 3 Drawing Figures

PATENTED OCT 9 1973 3,764,216

DAVID C. BLIEK
KENNETH A. SNOW
RICHARD E. VANDEWARKER
INVENTORS

BY Charles C. Krawczyk

ATTORNEY

INTERFEROMETRIC APPARATUS

This patent is a continuation from patent application, Ser. No. 631,797, filed Apr. 18, 1967, now abandoned.

BACKGROUND OF THE INVENTION relates to optical interferometric testing apparatus.

In a standard interferometric apparatus of prior art status, two waveforms simultaneously transmitted through, or reflected from, standard and test objects are continuously combined to provide an interference pattern. The waveforms from the standard object form a reference beam to which the waveforms from the test object are compared. Any differences in the standard and test objects appear as an interference fringe pattern.

In order to reduce anomalies in the interference fringe pattern, the optical paths of the reference and test beams are required to be matched to an extremely high degree of accuracy. For example, the lenses employed in the test and reference beams must be matched in all abberation qualities. The components of each optical path must be located within a high degree tolerance. Any beam splitter employed must have an accurately formed beam dividing angle, perfectly flat surfaces and a uniform index of refraction throughout. In effect, the optical path lengths of the test and reference beams must be perfectly matched so that the difference in the wavefronts emitted from both of the optical paths is due to the test and standard objects and not the testing apparatus itself. It is therefore extremely difficult and very expensive to manufacture such a perfectly matched interferometer.

Since the invention of the laser, a relatively new type of recording technique has been developed called holography. The laser provides a highly temporal and spatial coherent beam of radiation that can be split along two optical paths and then directed to recombine or intersect and provide an interference pattern. A recording made of the interference pattern on a radiation reactive film, such as a photographic film, and developed to form a permanent reconstructable record, is called a hologram.

Until the present invention, the use of the hologram to develop recordings of interference patterns generally required a double exposure on the recording medium. An example of a double exposure interferometric system is disclosed in an article entitled "Two-Beam Interferometry by Successive Recording of Intensities in a Single Hologram" by G. W. Stroke and A. E. Labeyrie in Applied Physics Letters, 15 Jan. 1966, Volume 8, Number 2. In the article a recording medium was first exposed to record an interference pattern developed by an optical apparatus and then subsequently double exposed to record the interference pattern with the test object. The double exposed recording medium was subsequently developed to provide a hologram of the composite interference pattern. An image of this interference pattern was reproduced by applying a laser beam to the hologram in a conventional manner. An individual hologram was required for each test object compared. In addition, separate apparatus was required for reproducing the interference pattern for observation.

Accordingly, it is an object of this invention to provide a new and improved interferometric apparatus, including a hologram providing a standard wavefront to which a plurality of test objects can be compared.

It is also an object of this invention to provide a new and improved method of making interference patterns, including a hologram providing a standard wavefront for comparison with test objects.

SUMMARY OF THE INVENTION

The interferometric apparatus of the invention includes a beam of temporal and spatially coherent radiation, such as a laser beam, divided to form a test and a reference beam. The test and reference beams are recombined to provide an interference pattern. A hologram recording is made of this interference pattern to provide a standard wavefront for comparison with wavefronts from objects to be tested.

In one embodiment of the invention the test beam is applied to a standard reflective object. A beam of radiation reflected from the standard object recombines with the reference beam and develops an interference pattern. A permanent hologram is made of the interference pattern. A test reflective object is subsequently substituted for the standard object. The wavefront reflected from the test object, the reference beam, and reconstructed wavefront of the prior interference pattern recorded in the hologram produce a comparison interference pattern between the standard and test objects.

In another embodiment of the invention the test beam is adapted to be transmitted through a radiation transmitting object. A hologram is made of the interference pattern of the combined test and reference beams with or without a standard object. A test transmissive object is subsequently inserted into the test beam. The waveforms of test beam, the reference beam, and the reconstruction waveforms of the prior interference pattern recorded on the hologram produce a comparison interference pattern between the standard and test objects.

DESCRIPTION OF THE ILLUSTRATED PRIOR ART APPARATUS

Figure 1:
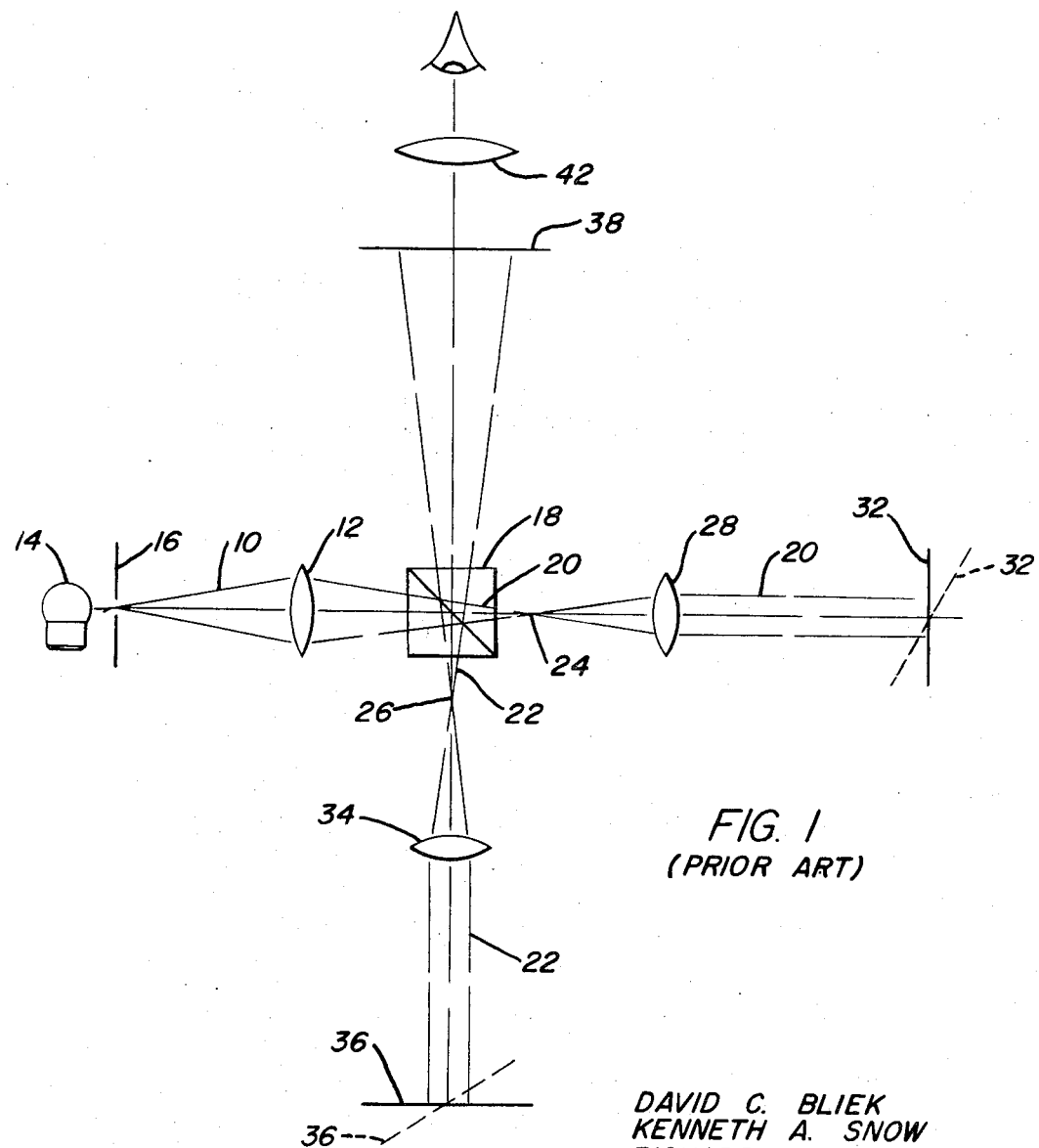
FIG. 1 is an optical schematic diagram of a standard interferometer of the prior art.

In the illustrated standard Michelson interferometer of the prior art of FIG. 1, a beam of radiation 10 is received by a condenser lens 12 from a source 14 through a field stop or pin hole 16. The condenser lens 12 directs the beam 10 towards a beam splitter 18. The beam 10 is focused by the lens 12 at a point beyond the beam splitter 18. The beam splitter 18 divides the beam 10 into a reference beam 20 and a sample or test beam 22. The pin hole 16 is imaged at the image planes 24 and 26 of the reference beam 20 and the test beam 22, respectively.

A micro-objective lens system, illustrated as a lens 28, is positioned in the path of the reference beam 20 with its focal point located at the image plane 24 so that the reference beam 20 is collimated and directed toward a reference plane 32, adapted to receive a standard reflective object. A second micro-objective lens system, illustrated as a lens 34, is positioned in the test beam 22 with its focal point located at the image plane 26 for collimating the test beam 22 and directing the beam toward a sample plane 36, adapted to receive test reflective objects to be compared with the standard.

Radiation reflected from a standard object positioned on the standard plane 32 is redirected by the lens 28 towards the beam splitter 18 to be reflected and imaged at an image plane 38. Radiation reflected from an object positioned on the sample plane 36 is redirected by the lens 34 through the beam splitter 18 to form an image of the test object on the image plane 38.

An interference pattern is developed between the reflected reference and test beams, respectively, that is directed through an eyepiece 42 for observation. If the surfaces of the test and reference objects being compared are identical and both the optical paths (including lenses 28 and 34 and beam splitter 18) are perfectly matched, the interference pattern, as viewed through the eyepiece 42, will be of a uniform intensity. On the other hand, if the test and reference objects, or the optical paths are different, the radiation observed through the eyepiece 42 forms an interference fringe pattern.

Since the differences between the surfaces of the test and reference objects are the factors to be measured, any differences between the optical paths of the test and reference beams effectively degrade the operation of the interferometric apparatus. Accordingly, the micro-objective lens system of the test and reference optical paths must be matched as closely as possible in all aberration qualities. The beam splitter 18 angle must be perfectly set to provide the correct degree of beam separation, its surfaces are perfectly flat and perpendicular to the beam to minimize reflection, and its index of refraction are uniform throughout so that both the test and reference beams follow identical optical paths. In addition to the foregoing, the position of the micro-objective lens systems must be accurately located with respect to the beam splitter 18 and the reference and sample planes to further guarantee that the path lengths are essentially identical. It can be readily seen that apparatus of this sort is extremely difficult and expensive to manufacture. Furthermore, since the components and their location is critical, care must be taken in the use of this delicate instrument to minimize the effects of vibration and temperature. The interferometric apparatus of the present invention illustrated in FIGS. 2 and 3 eliminate the need for two separate optical paths for the test and standard objects and thereby eliminate some of the complexities of building a standard interferometric apparatus of the prior art.

DESCRIPTION OF THE PREFERRED EMBODIMENTS OF THE INVENTION

Figure 2:
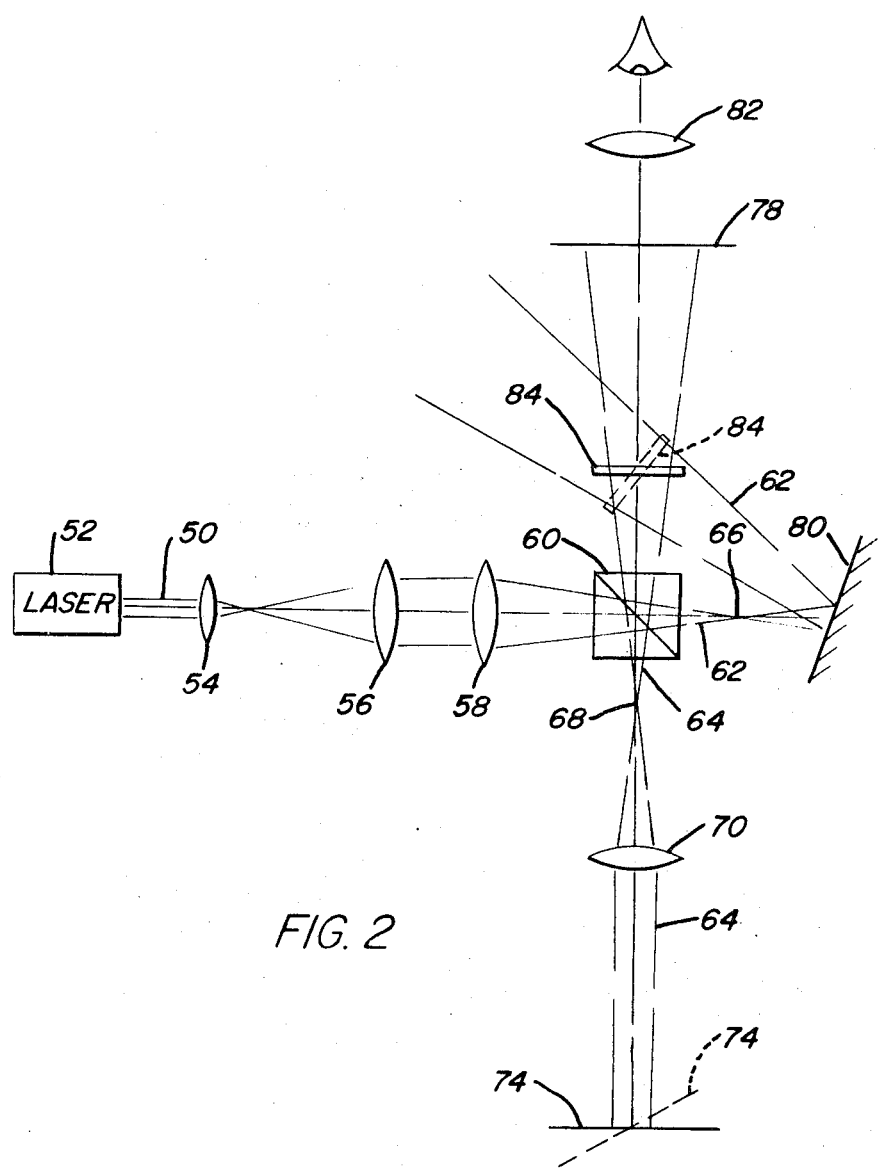
FIG. 2 is a first embodiment of the interferometric apparatus of the invention.

In the interferometric apparatus of FIG. 2 a beam of radiation 50 from a laser 52 is directed through an optical telescope system including the lenses 54 and 56 and through a condenser lens 58 to a conventional beam splitter 60. The condenser lens 58 focuses the laser beam at a point beyond the beam splitter 60.

The laser 52 provides a temporal and spatial coherent beam of electromagnetic radiation wherein the wavetrains eminating from the laser 52 maintain a constant phase difference. The expression temporal coherence refers to property of light often called monochromaticity, or more simply a very narrow band of wavelengths. For example a helium-neon gas laser operating in a $TEM_{oo}$ mode emits radiation at the wavelength of 6328A with a bandwidth in the order of 0.01 A. The expression spatial coherence refers to a property of light derived from a point. Although a laser source is illustrated in FIG. 1, it is to be understood that any other source of electromagnetic radiation having the requisite coherence properties can also be employed.

The lenses 54 and 56 are used to increase the width of the laser beam 50 so that a greater portion of the object to be tested can be irradiated with the beam 50. The beam splitter 60 splits the beam 50 into a reference beam 62 and a test beam 64. An image of the laser beam 50 is formed at the image planes 66, and 68 of the reference beam 62 and the test beam 64, respectively. A single micro-objective lens system, (illustrated as the lens 70) is positioned in the test beam 64 with its focal point located at the image plane 68 so that the beam 64 is collimated and applied to a test plane 74 adapted to sequentially receive a reflective standard object and a test object to be compared with the standard.

Radiation reflected from an object positioned on the test plane 74 is redirected by the lens 70 through the beam splitter 60 and imaged at an image plane 78. The reference beam is directed by a mirror 80 in a direction to intersect, or recombine with, the reflected test beam after it passes through the beam splitter 60. The irregular wave pattern reflected from the object on the test plane 74 interferes with the plane wave pattern of the reference beam 62 to produce an interference pattern. The interference pattern can be observed through an eyepiece 82. Although the reference beam 62 is reflected to intersect the test beam 64, it is to be understood that alternatively the test beam 64 can be reflected to intersect the reference beam.

One of the matched optical paths of the illustrated prior art apparatus of FIG. 1 is eliminated by the apparatus of the invention by making a hologram 84 of the interference pattern between the reflected test beam and the reference beam 62 with a standard object positioned on the test plane 74. This is accomplished by first inserting a radiation responsive medium, such as a photographic film, at the intersecting or combined portions of the beams (as schematically illustrated in FIG. 2) and exposing the medium or film for a predetermined period. The film may, for example, be an Eastman Kodak 649F spectroscope plate including a photosensitive emulsion several microns thick formed on a glass substrate. Exposure time is determined by the intensity of the laser beam.

After the film is exposed, it is developed to produce a permanent holographic record of the interference pattern. The hologram 84 is then reinserted in the same position as before. In effect a "frozen" record of the interference pattern of the apparatus including a standard object has been introduced into the apparatus that is capable of being reconstructed. The waves transmitted through a hologram when receiving a beam of temporal and spatially coherent radiation behave in all respects as the original waves received, as if they had not been interrupted by the photographic plate in their path. The waves released are indistinguishable from the original and are capable of all phenomena that characterized the original waves, i.e. capable of interfering constructively and destructively with other waves. Accordingly, the hologram 84 provides a medium for the reconstruction of an image of the wavefront pattern of the standard object to which the test objects can be compared.

With the hologram 84 inserted in place, a test object, or a plurality of test objects, can be sequentially positioned on the test plane 74 and a comparison interference pattern indicating the differences between the standard and test objects is observed through the eyepiece 82. In effect, the reference beam reconstructs the "frozen" wavefronts from the standard object. The wavefronts from the test object interfere with the reconstructed wavefronts thereby providing the comparison interference pattern. A separate hologram can be made for each combination of a standard object and micro-objective lens system used. When such a standard object is to be used as the standard of comparison with the same micro-objective lens system, the hologram 84 need merely be inserted ino the position as previously exposed.

It should be noted that only one optical path is used for both the standard and test objects. Accordingly, there is no need for matched optical systems as generally required in the interferometers of the prior art. The point at which the reference beam 62 intersects the reflected test beam is not critical and is limited to the geometry of the apparatus. The mirror 80 should be positioned in a manner to intersect the reflected test beam with the reference beam 62 in a position so that the radiation from the reference beam 62 is not directed into the eyepiece 82.

The hologram 84, after development, is used with the same micro-objective lens system and is replaced in the same identical position as before. One way of assuring the accurate positioning of the hologram 84 is to maintain the standard object on the test plane 74 and adjusting the position of the hologram 84 until a null pattern is observed through the eyepiece 82. A null pattern is observed when a uniform dark or light image is produced.

The phase relation between the wavefronts from the test object and the reconstructed wavefronts from the hologram 84 can be varied by angularly displacing either the hologram 84 or the test plane 74 (as illustrated by the dashed lines), although the displacement of the test plane 74 is preferred.

Although the hologram 84 is illustrated as positioned perpendicular to the test beam, the hologram can be located at an angle other than normal to the beam (in a manner as designated by the dashed block). In either case, the hologram 84 must be positioned in the same position as before to reconstruct the same wavefronts as reflected from the standard object.

Figure 3:
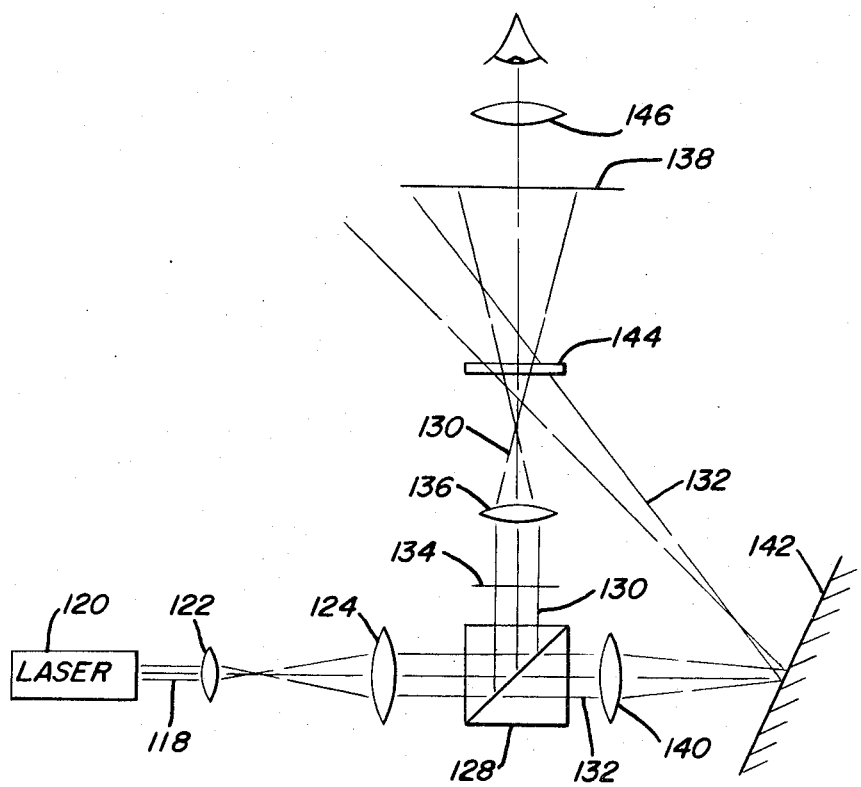
FIG. 3 is a second embodiment of the interferometric apparatus of the invention.

The embodiment of the invention of FIG. 3 is an equivalent to the Mach-Zender type of transmissive interferometer for making interferometric studies of pure phase or transmissive objects. A beam of radiation 118 from a laser 120 is transmitted through a telescope lens system (including lenses 122 and 124) to apply a collimated beam of radiation to a conventional beam splitter 128. The beam splitter 128 splits the laser beam 118 into a collimated test beam 130 and a collimated reference beam 132.

The collimated test beam 130 is transmitted through a specimen plane 134 that is adapted to receive transmissive standard and test objects to be compared. The test beam 130 is subsequently focused by a micro-objective lens system (illustrated by the lens 136) to form an image of an object positioned on the specimen plane 134 on an image plane 138. The collimated reference beam 132 is focused by a lens 140 and reflected by a mirror 142 to intersect, or recombine with, the test beam 130 to provide an interference pattern between the complex wavefronts transmitted through the specimen plane 134 and the plane wave of the reference beam 132.

A hologram 144 is made of the interference pattern in the combined portions of the reference beam 132 and the test beam 130. This hologram 144 is made with a standard transmissive object positioned on the specimen plane 134 or without any object at all. In the latter case the interference pattern is constructed of the wavefronts transmitted through the apparatus alone. The hologram 144 is developed and repositioned in a manner as previously set forth with regards to the embodiment of FIG. 2.

The test objects are now positioned on the specimen plane 134. The reference beam 132 reconstructs the wavefronts previously recorded in the hologram 144 so that the reconstructed wavefronts interfere constructively and destructively with the test beam 130. An interference fringe pattern is developed corresponding to the differences in the wavefronts transmitted through the standard and test objects ( or a purely transmissive standard when the hologram 144 was made of the apparatus alone without any standard object in the specimen plane). The interference pattern is observed through an eyepiece 146.

The hologram 144, or the specimen plane 134, can be rotated in the manner as previously set forth with regards to FIG. 2 to provide a desired degree of phase shift in the fringe pattern. It should be noted that the same optical path develops the wavefronts from the standard and test objects. The optics pertaining to the reference beam are not critical and are primarily determined by the geometry of the apparatus. Accordingly, since one of the optical paths of the prior art interferometric apparatus has been eliminated, there is no need for the expensive matched optics. In addition to the foregoing, the optical qualities of the single micro-objective lens system are of no consequence as long as the micro-objective lens system provide the desired degree of resolution thereby further reducing cost and simplifying design.

What is claimed is:

1. A holographic interferometric microscope having a first optical path for forming an image of an object and a second optical path for including a system holographic wavefront of the first optical path excluding an object and the second optical path excluding any imposed holographic wavefront comprising:

laser means for generating a beam of radiation;
   a beam splitter for splitting the generated beam of radiation into a system beam for traversing the first optical path and a holographic reference beam for traversing the second optical path;
   a subject plane disposed in the first optical path for receiving an object for study;
   a micro-objective lens system disposed in the first optical path for receiving the system beam from said beam splitter, for directing said system beam toward said subject plane, for receiving a reflected system beam from said subject plane and for directing said reflected system beam through said beam splitter;
   a hologram including the system holographic wavefront optically aligned with the holographic reference beam in the second optical path;

reflectance means disposed in the second optical path to direct the holographic reference beam through the optically aligned system hologram to holographically provide a reconstructed system beam providing the system holographic wavefront for intersecting a wavefront of the reflected system beam traversing the first optical path to form an interference pattern constructed by the wavefront of the reflected system beam in the first optical path and the system holographic wavefront from the second optical path; and optical means for observing the last mentioned interference pattern, formed when studying an object disposed at the subject plane, the last mentioned interference pattern formed by the system holographic wavefront from the aligned hologram in the second optical path and by an object wavefront traversing the first optical path which wavefront is directed through said beam splitter and which emanates from a system beam reflected from the object when the object is disposed in the subject plane, to thereby provide for viewing the last mentioned interference pattern which is a function of the object under study and which is generally independent of optical effects provided by generally undesirable intrinsic optical properties of the microscope elements.

2. The holographic interferometric microscope as defined in claim 1, wherein the subject plane disposed in the first optical path for receiving an object for study includes a high quality plano first surface mirror.

3. The holographic interferometric microscope as defined in claim 1, further comprising:
optical means including a telescopic lens system disposed to receive the beam of radiation from said laser means, to direct said beam of radiation to said beam splitter whereat the beam of radiation is split into a system beam and a holographic reference beam.

4. The holographic interferometric microscope as defined in claim 1, wherein said reflectance means comprises:
a reflector disposed at an inclination to reflect the holographic reference beam, traversing from said beam splitter, to intersect the reflected system beam.

5. A holographic interferometric microscope having a first optical path for forming an image of an object and a second optical path for including a system holographic wavefront of the first optical path excluding an object and the second optical path excluding any imposed holographic wavefront, comprising:
laser means for generating a beam of radiation;
a beam splitter for splitting the generated beam of radiation into a system beam for traversing the first optical path and a holographic reference beam for traversing the second optical path;
a subject plane disposed in the first optical path for receiving a non-opaque object for study;
a micro-objective lens system disposed in the first optical path for receiving the system beam from said beam splitter and for projecting the system beam through the subject plane;
a hologram including the system holographic wavefront optically aligned with the holographic reference beam in the second optical path;

reflectance means disposed in the second optical path to direct the holographic reference beam through the optically aligned system hologram to holographically provide a reconstructed system beam providing the system holographic wavefront for intersecting a wavefront of the reflected system beam traversing the first optical path to form an interference pattern constructed by the wavefront of the reflected system beam in the first optical path and the system holographic wavefront from the second optical path; and optical means for observing the last mentioned interference pattern, formed when studying a non-opaque object disposed at the subject plane, the last mentioned interference pattern formed by the system holographic wavefront from the aligned hologram in the second optical path and by an object wavefront traversing the first optical path which includes the micro-objective lens system and the subject plane having disposed therein the non-opaque object under study, to thereby provide for viewing the last mentioned interference pattern which is a function of the object under study and which is generally independent of optical effects provided by generally undesirable intrinsic optical properties of the microscope elements.

6. The holographic interferometric microscope as defined in claim 5, further comprising:
optical means including a telescopic lens system disposed to receive the beam of radiation from said laser means, to direct said beam of radiation to said beam splitter whereat the beam of radiation is split into a system beam and a holographic reference beam.

7. The holographic interferometric microscope as defined in claim 5, wherein said reflectance means comprises:
a reflector disposed at an inclination to reflect the holographic reference beam, traversing from said beam splitter, to intersect the reflected system beam.

8. A holographic interferometric microscope having a first optical path for forming an image of an object and a second optical path for including a system holographic wavefront of the first optical path including a standard object and the second optical path excluding any imposed holographic wavefront, comprising:
laser means for generating a beam of radiation;
a beam splitter for splitting the generated beam of radiation into a system beam for traversing the first optical path and a holographic reference beam for traversing the second optical path;
a subject plane disposed in the first optical path for receiving an object for study;
a micro-objective lens system disposed in the first optical path for receiving the system beam from said beam splitter, for directing said system beam toward an object in the subject plane, for receiving a reflected system beam from the object in the subject plane and for directing said reflected system beam through said beam splitter;
a hologram including the system holographic wavefront optically aligned with the holographic reference beam in the second optical path;
reflectance means disposed in the second optical path to direct the holographic reference beam through the optically aligned system hologram to holographically provide a reconstructed system beam providing the system holographic wavefront for intersecting a wavefront of the reflected system beam traversing the first optical path to form an interference pattern constructed by the wavefront of the reflected system beam in the first optical path and the system holographic wavefront from the second optical path; and optical means for observing the last mentioned interference pattern formed when studying an object disposed at the subject plane, the last mentioned interference pattern formed by the system holographic wavefront from the aligned hologram in the second optical path and by an object wavefront traversing the first optical path which wavefront is directed through said beam splitter and which emanates from a system beam reflected from the object when the object is disposed in the subject plane, to thereby provide for viewing the last mentioned interference pattern which is a function of the object under study and which is generally independent of optical effects provided by generally undesirable intrinsic optical properties of the microscope elements.

9. A holographic interferometric microscope having a first optical path for forming an image of an object and a second optical path for including a system holographic wavefront of the first optical path including a standard non-opaque object and the second optical path excluding any imposed holographic wavefront, comprising:

laser means for generating a beam of radiation;

a beam splitter for splitting the generated beam of radiation into a system beam for traversing the first optical path and a holographic reference beam for traversing the second optical path;

a subject plane disposed in the first optical path for receiving a non-opaque object for study;

a micro-objective lens system disposed in the first optical path for receiving the system beam from said beam splitter and for projecting the system beam through a non-opaque object in the subject plane;

a hologram including the system holographic wavefront optically aligned with the holographic reference beam in the second optical path;

reflectance means disposed in the second optical path to direct the holographic reference beam through the optically aligned system hologram to holographically provide a reconstructed system beam providing the system holographic wavefront for intersecting a wavefront of the reflected system beam traversing the first optical path to form an interference pattern constructed by the wavefront of the reflected system beam in the first optical path and the system holographic wavefront from the second optical path; and optical means for observing the last mentioned interference pattern, formed when studying a non-opaque object disposed at the subject plane, the last mentioned interference pattern formed by the system holographic wavefront from the aligned hologram in the second optical path and by an object wavefront traversing the first optical path which includes the micro-objective lens system and the subject plane having disposed therein the non-opaque object under study, to thereby provide for viewing the last mentioned interference pattern which is a function of the object under study and which is generally independent of optical effects provided by generally undesirable intrinsic optical properties of the microscope elements.

10. A method of producing for viewing in an optical instrument, an interference pattern constructed by a wavefront traversing from an object under study in the optical instrument intersecting a wavefront from a hologram formed of the optical path of the optical instrument, comprising the steps of:

mounting radiation sensitive film in the optical path of a conventional microscope for receiving for recording a first interference pattern formed by a first wavefront traversing the optical path of the conventional microscope, intersecting with a second wavefront bypassing the optical path of the conventional microscope, wherein the first and second wavefronts originate from a single beam split to, respectively, traverse the optical path and the bypass path;

exposing the film in the microscope to the first interference pattern at the intersection of the wavefronts to record the first interference pattern;

removing and developing the film to thereby form a hologram and permanently register the first interference pattern in the film;

remounting the film displaying the first interference pattern;

aligning the first interference pattern of the exposed film with the first and second wavefronts which formed the first interference pattern;

mounting an object for study in a study plane disposed in the optical path of the conventional microscope; and viewing a second interference pattern formed by and at the intersection of the wavefront of the hologram and the wavefront traversing from the object under study disposed in the subject plane, to provide for viewing an interference pattern which is a function of the object under study and which is generally independent of optical effects provided by generally undesirable intrinsic optical properties of the conventional microscope.

11. A method of producing for viewing in an optical instrument, an interference pattern constructed by a wavefront traversing from an object under study in the optical instrument intersecting a wavefront from a hologram formed of the optical path of the optical instrument and a standard object disposed in the optical path, comprising the steps of:

mounting radiation sensitive film in the optical path of a conventional microscope for receiving for recording a first interference pattern formed by a first wavefront traversing the optical path of the conventional microscope with a standard object disposed therein, intersecting with a second wavefront bypassing the optical path of the conventional microscope, wherein the first and second wavefronts originate from a single beam split to, respectively, traverse the optical path and the bypass path;

exposing the film in the microscope to the first interference pattern at the intersection of the wavefronts to record the first interference pattern;

removing and developing the film to thereby form a hologram and permanently register the first interference pattern on the film;

remounting the film displaying the first interference pattern;

aligning the first interference pattern of the exposed film with the first and second wavefronts which formed the first interference pattern;

mounting an object for study in a study plane disposed in the optical path of the conventional microscope; and viewing a second interference pattern formed by and at the intersection of the wavefront of the hologram and by the wavefront traversing from the object under study disposed in the subject plane, to provide for viewing an interference pattern which is a function of the object under study and which is generally independent of optical effects provided by generally undesirable intrinsic optical properties of the conventional microscope.

* * * * *